(12) United States Patent
Backman et al.

(10) Patent No.: US 10,002,722 B2
(45) Date of Patent: Jun. 19, 2018

(54) SWITCHING SYSTEM FOR BREAKING A CURRENT AND METHOD OF PERFORMING A CURRENT BREAKING OPERATION

(71) Applicant: ABB Schweiz AG, Baden (CH)

(72) Inventors: Magnus Backman, Västerås (SE); Stefan Valdemarsson, Lidköping (SE)

(73) Assignee: ABB Schweiz AG, Baden (CH)

( * ) Notice: Subject to any disclaimer, the term of this patent is extended or adjusted under 35 U.S.C. 154(b) by 0 days. days.

(21) Appl. No.: 15/551,807

(22) PCT Filed: Feb. 19, 2016

(86) PCT No.: PCT/EP2016/053530
§ 371 (c)(1),
(2) Date: Aug. 17, 2017

(87) PCT Pub. No.: WO2016/131949
PCT Pub. Date: Aug. 25, 2016

(65) Prior Publication Data
US 2018/0041021 A1 Feb. 8, 2018

(30) Foreign Application Priority Data
Feb. 20, 2015 (EP) .................................... 15155971

(51) Int. Cl.
*H01H 9/54* (2006.01)
*H01H 9/30* (2006.01)
(Continued)

(52) U.S. Cl.
CPC .............. *H01H 9/542* (2013.01); *H01H 9/30* (2013.01); *H01H 33/04* (2013.01);
(Continued)

(58) Field of Classification Search
CPC .......... H01H 9/30; H01H 9/542; H01H 33/04; H01H 33/596; H02H 3/081; H02H 3/087
See application file for complete search history.

(56) References Cited

U.S. PATENT DOCUMENTS 4,805,062 A * 2/1989 Shirouzu .............. H01H 33/596
361/13
4,920,448 A * 4/1990 Bonhomme ........... H01H 3/222
361/102
(Continued)

FOREIGN PATENT DOCUMENTS

CN 103337851 A 10/2013
EP 2523204 A1 11/2012
(Continued)

OTHER PUBLICATIONS

KR1020130096253. Aug. 14, 2013.*
(Continued)

*Primary Examiner* — Thienvu Tran
*Assistant Examiner* — Christopher Clark
(74) *Attorney, Agent, or Firm* — Whitmyer IP Group LLC

(57) ABSTRACT

A switching system for breaking a current, including a contact arrangement having a first and second terminals, a resonance circuit connectable across the contact arrangement, In the closed state the first switch enables current to flow through the resonance circuit in a first flow direction and into the contact arrangement in a direction opposite to a contact arrangement arc current flow direction. A second switch connected to the resonance circuit and to the second terminal. In the closed state the second switch enables current to flow through the resonance circuit in a second flow direction opposite to the first flow direction. A control system arranged to alternatingly set the first and second switches in the closed state and then in the open state upon a current breaking operation, until a current pulse, emanat- (Continued)

ing from energy supplied by a contact arrangement arc current, flowing through the resonance circuit and into the contact arrangement reaches an amplitude which is equal to or greater than a magnitude of a contact arrangement arc current.

20 Claims, 5 Drawing Sheets

(51) Int. Cl.
*H01H 33/04* (2006.01)
*H02H 3/087* (2006.01)
*H01H 33/59* (2006.01)
*H02H 3/08* (2006.01)
*H02H 3/02* (2006.01)

(52) U.S. Cl.
CPC ............ *H01H 33/596* (2013.01); *H02H 3/02* (2013.01); *H02H 3/081* (2013.01); *H02H 3/087* (2013.01); *H01H 2009/543* (2013.01)

(56) References Cited

U.S. PATENT DOCUMENTS

| | | | | |
|---|---|---|---|---|
| 5,214,557 | A * | 5/1993 | Hasegawa | H01H 33/596 361/11 |
| 8,837,093 | B2 * | 9/2014 | Panousis | H01H 33/596 361/13 |
| 2011/0156495 | A1 * | 6/2011 | Saligram | H01H 9/42 307/115 |
| 2013/0020881 | A1 * | 1/2013 | Panousis | H01H 33/596 307/113 |
| 2013/0070492 | A1 * | 3/2013 | Skarby | H01H 33/596 363/51 |
| 2016/0204595 | A1 * | 7/2016 | Park | H02H 3/087 361/10 |
| 2016/0322177 | A1 * | 11/2016 | Hwang | H02H 3/087 |
| 2016/0322178 | A1 * | 11/2016 | Park | H01H 9/30 |
| 2017/0263399 | A1 * | 9/2017 | Heinz | H01H 33/167 |

FOREIGN PATENT DOCUMENTS

| | | |
|---|---|---|
| EP | 2768102 A1 | 8/2014 |
| EP | 3059827 A1 | 8/2016 |
| JP | 2012195121 A | 10/2012 |
| WO | 2012100831 A1 | 8/2012 |
| WO | 2014166528 A1 | 10/2014 |
| WO | 2015023157 A1 | 2/2015 |

OTHER PUBLICATIONS

European Search Report Application No. 15155971.3 Completed Date: Aug. 25, 2015; dated Sep. 8, 2015 4 Pages.
International Search Report & Written Opinion Application No. PCT/EP2016/053530 Completed Date: Apr. 26, 2016; dated May 24, 2016 27 Pages.
Jadidian et al: "Numerical Simulation of an Explosively Driven HVDC Circuit Breaker" J. Plasma Fusion Res. Serioes, vol. 8, 2009 Published: Feb. 9, 2009, Tehran, Iran. 5 Pages.
European Search Report Application No. 15155971.3 Completed Date: Aug. 25, 2015; Dated: Sep. 8, 2015 4 Pages.
International Search Report & Written Opinion Application No. PCT/EP2016/053530 Completed Date: Apr. 26, 2016; Dated: May 24, 2016 27 pages.

* cited by examiner

SWITCHING SYSTEM FOR BREAKING A
CURRENT AND METHOD OF PERFORMING
A CURRENT BREAKING OPERATION

TECHNICAL FIELD

The present disclosure generally relates to switching systems for breaking a current. In particular it relates to a switching system of the type that does not rely on natural zero-crossings for performing a current breaking operation, and to a method of performing a current breaking operation.

BACKGROUND

Switching systems are used for interrupting a current or protecting an electric circuit in the event of an electrical failure for example due to a short circuit. Switching systems may comprise contacts which during normal operation are in mechanical connection. When the contacts are separated from each other a current breaking operation is effected. In addition to separating the contacts, a current breaking operation involves extinguishing an arc between the contacts, and to force the current to zero.

Alternating current (AC) switching systems utilise the naturally occurring zero-crossings of the alternating current flowing through the switching system for extinguishing the arc.

Direct current (DC) switching systems cannot utilise natural zero-crossings since there are none. It is known to create artificial zero-crossings for DC switching systems in order to be able to perform a current breaking operation. One way to obtain an artificial zero-crossing is by utilising a resonance circuit connected across the contacts. The resonance circuit comprises a capacitor which is continually charged by an energy source. The capacitor is charged to obtain a polarity which enables a capacitor discharge current to flow through the contacts in the opposite direction relative to the arc current flowing through the arc. The arrangement furthermore comprises a switch which normally is in its open state. When a current breaking operation is effected and the contacts are separated, the switch is closed, wherein the capacitor discharges its electric charge and the resonance circuit provides a current pulse into the contacts. The current pulse flows in the opposite direction relative to the arc current. By selecting suitable values of the capacitor and inductance in the resonance circuit, an artificial zero-crossing is obtained. At this time the arc generated at the contacts, which enables the arc current to continue to flow after opening of the separation of the contacts, may be extinguished by deionization of the hot plasma and/or gas in the gap between the contacts. In this manner it is possible to break the arc current.

The above-described artificial zero-crossing creation requires that the capacitor is charged at all times. Furthermore a power supply is needed to constantly charge the capacitor. Moreover, the artificial zero-crossing provides for only a single chance to successfully extinguish the arc and thus to break the arc current.

SUMMARY

An object of the present disclosure is to solve, or at least mitigate, the problems of the prior art.

Hence, according to a first aspect of the present disclosure there is provided a switching system for breaking a current, comprising: a contact arrangement having a first terminal and a second terminal, a resonance circuit connectable across the contact arrangement, a first switch connected to the resonance circuit and to the first terminal, wherein the first switch is switchable between an open state and a closed state, wherein in the closed state the first switch is arranged to enable current to flow through the resonance circuit in a first flow direction and into the contact arrangement in a direction opposite to a contact arrangement arc current flow direction, a second switch connected to the resonance circuit and to the second terminal of the contact arrangement, wherein the second switch is switchable between an open state and a closed state, wherein in the closed state the second switch is arranged to enable current to flow through the resonance circuit in a second flow direction opposite to the first flow direction, and a control system, wherein the control system is arranged to alternatingly first set the first switch, and then the second switch, first in the closed state and then in the open state upon a current breaking operation, until a current pulse, emanating from energy in an arc generated by the current breaking operation, flowing through the resonance circuit and into the contact arrangement reaches an amplitude which is equal to or greater than a magnitude of a contact arrangement arc current.

An effect which may be obtainable thereby is that the energy storage circuit of the resonance circuit is charged with a voltage which will increase in each iteration of the alternating on-off switching of the two switches, resulting in a current pulse into the contact arrangement, flowing in the opposite direction to the contact arrangement arc current flowing through the arc. When the voltage is large enough, the current pulse will become equal to or larger than the contact arrangement arc current, resulting in an artificial zero-crossing. This alternating on-off switching hence provides a pumping effect of the current pulse, which grows larger for every iteration. This results in that a plurality of successive artificial zero-crossings can be obtained. It will therefore always be additional opportunities for extinguishing the arc if arc extinction would prove to be unsuccessful in conjunction with a zero-crossing. Moreover, the energy storage circuit of the resonance circuit does not have to be charged during normal operation, which is necessary in the prior art, since the resonance circuit receives energy emanating from the arc.

The switching system may be utilised in DC applications or AC applications. Advantageously, in the latter case, an artificial zero-crossing may be created before a natural zero-crossing occurs.

According to one embodiment in each iteration of alternatingly first setting the first switch, and then the second switch, first in the closed state and then in the open state, the control system is arranged to:
  set the first switch in the closed position, enabling a first current pulse to flow through the resonance circuit in the first flow direction,
  set first the first switch in the open state and then the second switch in the closed state when the first current pulse has become zero to enable a second current pulse to flow through the resonance circuit in the second flow direction, and
  to set the second switch in the open state when the second current pulse first has become zero.

One embodiment comprises an arc extinguisher arranged to extinguish an arc across the contact arrangement.

According to one embodiment the resonance circuit comprises a capacitor and an inductor. Since the capacitor does not have to be charged during normal operation, as it only charged during the "pumping" in conjunction with a current breaking operation, the capacitor can be stressed considerably more than in prior art solutions, reducing the size and cost in the order of 2 to 4 times, especially for film capacitors.

According to one embodiment the second switch is connected across the resonance circuit.

One embodiment comprises a third switch switchable between an open state and a closed state, wherein the third switch is connected to the second terminal of the contact arrangement and to the resonance circuit, and wherein the control system is arranged to set the third switch in the closed state simultaneously with setting the first switch in the closed state and to set the third switch in the open state simultaneously with setting the first switch in the open state.

One embodiment comprises a fourth switch switchable between an open state and a closed state, wherein the fourth switch is connected to the resonance circuit and to the first terminal of the contact arrangement, and wherein the control system is arranged to set the fourth switch in the closed state simultaneously with setting the second switch in the closed state and to set the fourth switch in the open state simultaneously with setting the second switch in the open state. This provides a full-wave current pulse pumping, which enables the current pulse to receive energy in both of the half periods of the repetitive sequence, i.e. both during the simultaneous opening/closing of the first switch and third switch, and also during the simultaneous opening/closing of the second switch and fourth switch.

According to one embodiment the first switch and the second switch are semiconductor switches.

According to one embodiment the third switch and the fourth switch are semiconductor switches.

According to one embodiment the control system is configured to alternatingly switch first the first switch and then the second switch, first in the closed state and then in the open state, with a first frequency for a first time interval and subsequently with a second frequency slower than the first frequency for a second time interval.

According to a second aspect of the present disclosure there is provided a method of performing a current breaking operation by means of a switching system comprising a contact arrangement having a first terminal and a second terminal, a resonance circuit connectable across the contact arrangement, a first switch connected to the resonance circuit and to the first terminal, wherein the first switch is switchable between an open state and a closed state, wherein in the closed state the first switch is arranged to enable current to flow through the resonance circuit in a first flow direction and into the contact arrangement in a direction opposite to a contact arrangement arc current flow direction, a second switch connected to the resonance circuit and to the second terminal, wherein the second switch is switchable between an open state and a closed state, wherein in the closed state the second switch is arranged to enable current to flow through the resonance circuit in a second flow direction opposite to the first flow direction, and a control system, wherein the method comprises: alternatingly first setting the first switch, and then the second switch, first in the closed state and then in the open state by means of the control system, upon a current breaking operation, until a current pulse, emanating from energy supplied by a contact arrangement arc current, flowing through the resonance circuit reaches an amplitude which is equal to or greater than a magnitude of the contact arrangement arc current.

According to one embodiment each iteration of the step of alternatingly first setting the first switch, and then the second switch, first in the closed state and then in the open state comprises:

a) setting the first switch in the closed state, enabling a first current pulse to flow through the resonance circuit in the first flow direction, b) setting first the first switch in the open state and then the second switch in the closed state when the first current pulse has become zero to enable a second current pulse to flow through the resonance circuit in the second flow direction, and c) setting the second switch in the open state when the second current pulse first has become zero.

According to one embodiment the switching system for breaking a current comprises a third switch switchable between an open state and a closed state, wherein the third switch is connected to the second terminal of the contact arrangement and to the resonance circuit, wherein the step of alternatingly first setting the first switch, and then the second switch, first in the closed state and then in the open state comprises:

setting the third switch in the closed state simultaneously with setting the first switch in the closed state, and setting the third switch in the open state simultaneously with setting the first switch in the open state.

According to one embodiment the switching system for breaking a current comprises a fourth switch switchable between an open state and a closed state, wherein the fourth switch is connected to the resonance circuit and to the first terminal of the contact arrangement, wherein the step of alternatingly first setting the first switch, and then the second switch, first in the closed state and then in the open state comprises:

setting the fourth switch in the closed state simultaneously with setting the second switch in the closed state, and setting the fourth switch in the open state simultaneously with setting the second switch in the open state.

According to one embodiment the switching system for breaking a current comprises an arc extinguisher, wherein the method comprises extinguishing an arc across the contact arrangement by means of the arc extinguisher when the current pulse flowing through the resonance circuit reaches an amplitude which is equal to or greater than a magnitude of the contact arrangement arc current.

According to one embodiment the resonance circuit comprises a capacitor and an inductor.

According to one embodiment the step of alternatingly first setting the first switch and then the second switch, first in the closed state and then in the open state, is performed with a first frequency for a first time interval and subsequently with a second frequency slower than the first frequency for a second time interval.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc., unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

Figure 1:
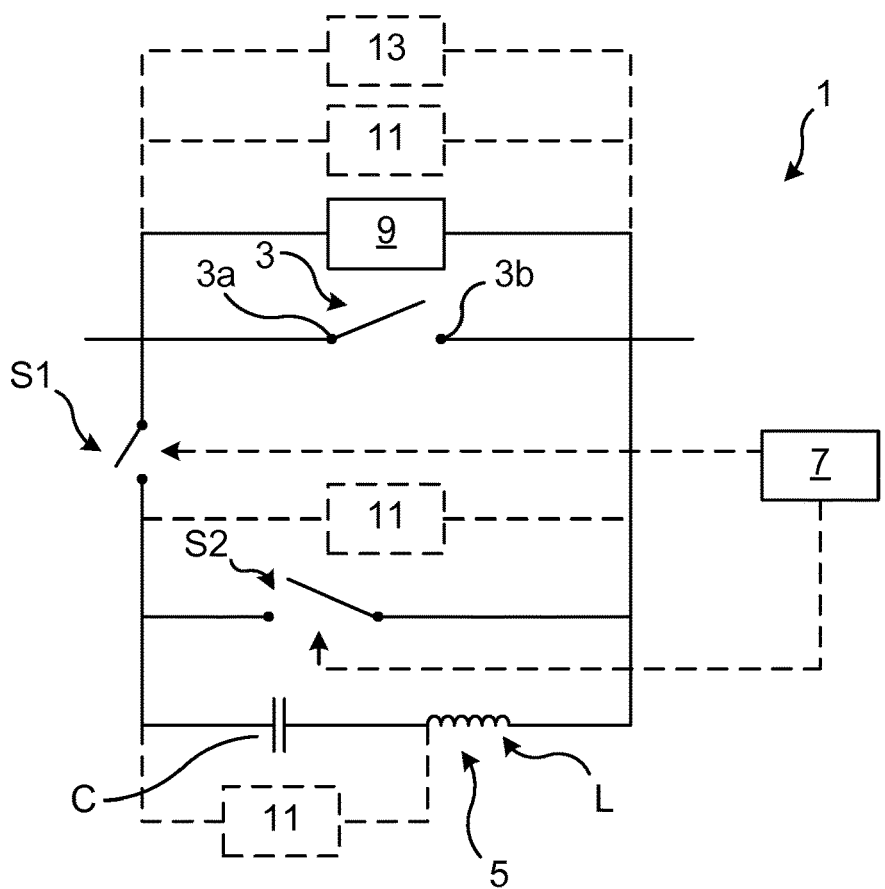
FIG. 1 shows an example of a switching system for breaking a current.

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

A number of variations of a switching system for breaking a current will be described herein. The switching system may be used in AC applications or in DC applications. The switching system comprises a contact arrangement having a movable breaker contact and a fixed contact. The breaker contact can be actuated between a closed position in which it is in mechanical contact with the fixed contact and an open position in which the breaker contact is mechanically separated from the fixed contact. The movable breaker contact defines a first terminal of the contact arrangement and the fixed contact defines a second terminal of the contact arrangement.

The switching system comprises a resonance circuit, which is an LC-circuit comprising a capacitor and an inductor. The capacitor may for example be a film capacitor. The resonance circuit is connectable across the contact arrangement.

The switching system furthermore comprises a first switch and a second switch. The first switch is switchable between a closed state and an open state. The second switch is switchable between a closed state and an open state. The first switch is connected to the resonance circuit and to the first terminal of the contact arrangement. The second switch is connected to the resonance circuit and to the second terminal of the contact arrangement.

The first switch is arranged to, in the closed state, enable a current to flow through the resonance circuit in a first flow direction and to enable current to flow from the resonance circuit into the contact arrangement in a direction opposite to a contact arrangement arc current flow direction. This opposite direction current influences the magnitude of the contact arrangement arc current.

The second switch is arranged to, in the closed state, enable a current to flow through the resonance circuit in a second flow direction opposite to the first flow direction.

The switching system comprises a control system which is arranged to control the first switch and the second switch. The control system is arranged to be triggered by a current breaking operation, e.g. by emanating from energy supplied by the contact arrangement arc current. The control system is arranged to alternatingly first set the first switch, and then the second switch, first in the closed state and then in the open state, triggered by a current breaking operation which involves the breaker contact being opened, i.e. moved away from the fixed contact, and as a result the generation of an arc between the spaced apart breaker contact and fixed contact. The control system is in particular arranged to alternatingly switch the first switch and the second switch between their respective open state and closed state until a current pulse emanating from energy supplied by a contact arrangement arc current, flowing through the resonance circuit and into the contact arrangement reaches an amplitude which is equal to or greater than the magnitude of the contact arrangement arc current.

The first switch, the second switch and the resonance circuit form a pumping circuit, which is arranged to inject a current pulse with higher and higher amplitude for each repetition, i.e. for each iteration of alternatingly first set the first switch, and then the second switch, first in the closed state and then in the open state. Depending on the number of switches, and their connection to the resonance circuit, a half-wave pumping circuit or a full-wave pumping circuit may be obtained. Examples of switching systems which provide half-wave pumping will be described with reference to FIGS. 1 to 3b. Examples of switching systems which provide full-wave pumping will be described with reference to FIGS. 4 to 6.

FIG. 1 depicts a first example of a switching system 1 for breaking a current. The switching system 1 comprises a contact arrangement 3 having a first terminal 3a and a second terminal 3b. The contact arrangement 3 comprises a movable breaker contact and a fixed contact. The contact arrangement 3 may be set in an open state by moving the breaker contact away from the fixed contact, and in a closed state in which the breaker contact is in mechanical contact with the fixed contact.

The switching system 1 furthermore comprises a first switch S1, a second switch S2, a resonance circuit 5, a control system 7, an arc extinguisher 9 and an energy absorber 11.

The resonance circuit 5 is connectable across the contact arrangement 3. The resonance circuit 5 is in particular connectable across the contact arrangement 3 by means of the first switch S1 and by means of the second switch S2. The resonance circuit 5 comprises a capacitor C and an inductor L. The capacitor C may for example be a film capacitor, and the inductor L may either be an inductor component or the inherent inductance of the conductor to which the capacitor C is connected.

The first switch S1 is switchable between an open state and a closed state. The first switch S1 is connected to the first terminal 3a of the switching system 1 and to the resonance circuit 5. The first switch S1 is connected in such a way that in the closed state it enables a current pulse emanating from energy supplied by the contact arrangement arc current I to flow in a first flow direction through the resonance circuit 5. It furthermore enables the current to flow into the contact arrangement in a direction opposite to the contact arrangement arc current flow direction which flows through the contact arrangement via the arc.

The second switch S2 is switchable between an open state and a closed state. The second switch S2 is connected to the second terminal 3b of the switching system 1 and to the resonance circuit 5. In particular, the second switch S2 is connected across the resonance circuit 5.

The control system 7 is arranged to alternatingly switch first the first switch S1 between its open state and closed state and then to switch the second switch S2 between its open state and closed state. The control system 7 is arranged to be triggered to control the first switch S1 and the second switch S2 by energy supplied by the contact arrangement arc current. The control system 7 is arranged to alternatingly switch first the first switch S1 between its open state and closed state and then to switch the second switch S2 between its open state and closed state until a current pulse, emanating from energy supplied by the contact arrangement arc current, flowing through the resonance circuit 5 and into the contact arrangement via the first switch S1 has an amplitude which is equal to or preferably larger than the contact arrangement arc current flowing through the contact arrangement 3. At the time when the current pulse has an amplitude that equals the magnitude of the contact arrangement arc current, an artificial zero-crossing is created, facilitating the extinguishing of the arc.

The arc extinguisher 9 is arranged to extinguish an arc across the contact arrangement 3. The arc extinguisher 9, which may be a passive arc extinguisher, is connected across the contact arrangement 3. The arc extinguisher 9 may for example be a thyristor, a transistor, a diode, arc blowing methods, arc cooling means or arc runners. Furthermore, the contact arrangement as such could according to one variation be provided with an intrinsic arc extinguishing ability, for example if the contact arrangement is a vacuum interrupter, in which case the arc extinguisher forms part of the contact arrangement 3.

The energy absorber 11 is arranged to absorb energy to thereby force the contact arrangement arc current to zero upon the creation of an artificial zero-crossing. FIG. 1 shows a number of different connections in which the energy absorber 11 may be connected. The energy absorber 11 may thus for example be connected across the contact arrangement 3, across the capacitor C, or across the resonance circuit 5. The energy absorber 11 may for example be a surge arrester.

The switching system 1 may optionally comprise a secondary energy source 13. The current pulses through the resonance circuit 5 may thus either be driven solely by the energy in the arc itself, or alternatively, in variations comprising the secondary energy source 13, by the secondary energy source 13, which itself has received energy from the arc. Such a secondary energy source may for example be a positive temperature coefficient (PTC) resistor.

Figure 2A:
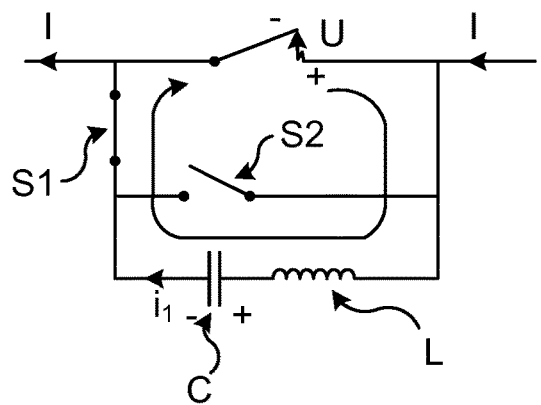
FIGS. 2a-2b shows the switching system for breaking a current in FIG. 1 in operation.

The operation of the switching system 1 will now be described with reference to FIGS. 2a-2b, 3a-2b and FIG. 7. Under normal conditions current flows through the closed contact arrangement 3. The first switch S1 and the second switch S2 are then both in their open state. When the breaker contact is opened to effect a current breaking operation, in order to set the contact arrangement 3 in the open state, or a short time thereafter, the control system 7 is in a step a) arranged to set the first switch S1 in the closed state at a time t1, as shown in FIG. 2a and FIG. 3a. A current pulse i1 driven by an arc voltage U thus starts flowing through the resonance circuit 5 in a first flow direction, charging the capacitor C to a positive polarity. The current pulse i1 flows through the first switch S1 and into the contact arrangement 3, in an opposite direction relative to the contact arrangement arc current flowing through the arc and through the contact arrangement.

Alternatively, in variations comprising the secondary energy source 13 the current I has been commutated from the contact arrangement 3 to the secondary energy source 13, which has extinguished the arc, and the voltage over the secondary energy source 13 is instead driving the current pulse i1.

When the current pulse i1 oscillates back and becomes zero at a time t2, in a step b) the control system 7 is arranged to switch off the first switch S1. The capacitor C is now charged approximately to the voltage 2U.

Figure 2B:
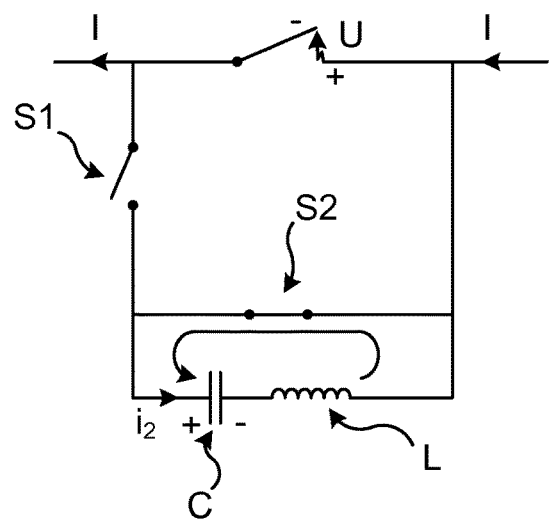
Figure 3A:
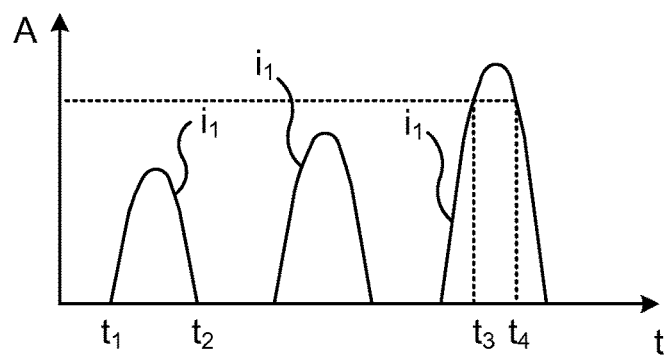
FIGS. 3a-3b show graphs of current pulses obtained by means of the circuit breaker in FIG. 1 in operation.
Figure 3B:
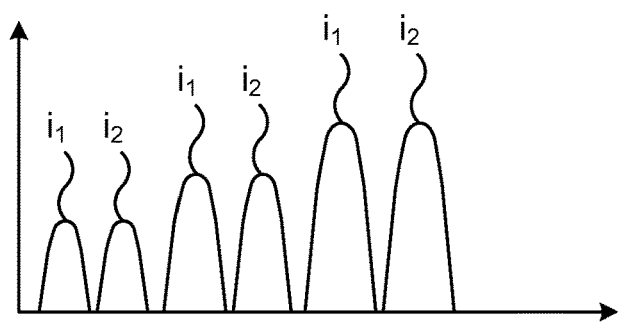

At the time t2 when the current pulse i1 becomes zero or a short time thereafter, in a step c) the control system 7 is arranged to set the second switch S2 in the closed state, as shown in FIG. 2b. A current pulse i2 will flow in a second flow direction opposite to the first flow direction reversing the polarity of the capacitor C. The control system 7 is arranged to set the second switch S2 in the open state as soon as the current pulse i2 becomes zero and the capacitor C is charged to the voltage −2U. Both the first switch S1 and the second switch S2 are now in the open state.

The control system 7 repeats steps a) to c) and the voltage over the capacitor C will increase with 2U each iteration of steps a)-c) being carried out. After some iterations or cycles, the amplitude of the current pulse i1 has grown and when it becomes equal to the contact arrangement arc current I, for example at time t3, the arc will be extinguished momentarily.

At each instance when the current pulse i1 is equal to the contact arrangement arc current I, there is an opportunity to permanently extinguish the arc and break the contact arrangement arc current I by means of the arc extinguisher 9. After a successful arc extinction at time t4 the contact arrangement arc current I will flow through the capacitor C and finally the energy absorber 11 will force down the contact arrangement arc current I to zero.

In the exemplified half-wave pumping circuit the current pulse only receives energy in one of the two half periods of the repetitive sequence. In the first half the capacitor receives additional energy charge from the arc voltage U and in the other half the polarity of the capacitor is reversed, losing some charge owing to the losses in the current path.

Figure 4:
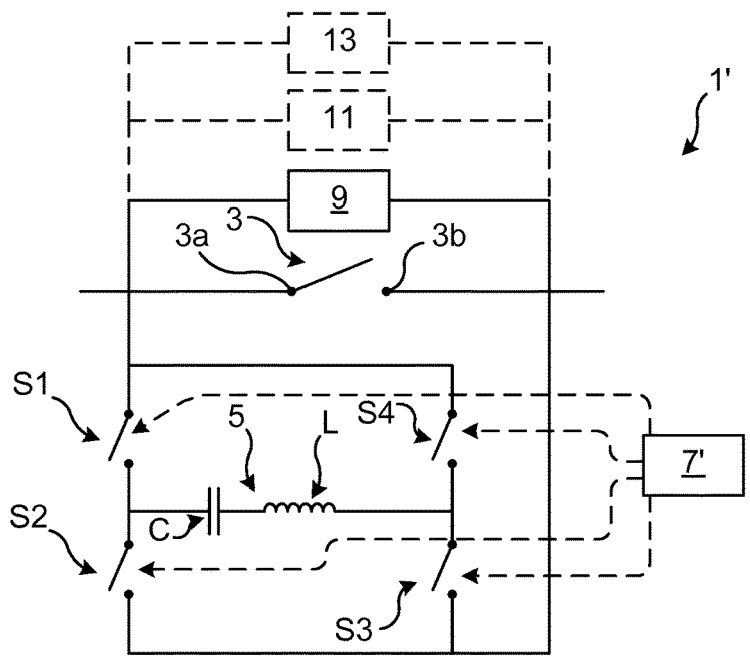
FIG. 4 is another example of a switching system for breaking a current.

An example of a switching system with full-wave pumping capability is illustrated with reference to FIG. 4. The benefit is that the peak value of the injection current can be almost doubled and increased at a higher rate.

Switching system 1' is identical to switching system 1, except that it comprises four switches S1-S4, each being switchable between an open state and a closed state. The switches S1-S4 and the resonance circuit 5 are connected in an "H-bridge" type of configuration. The first switch S1 is connected to the first terminal 3a of the contact arrangement 3 and to the resonance circuit 5. The second switch is connected to the resonance circuit 5 and to the second terminal 3b of the contact arrangement 3. The first switch S1 and the second switch S2 are both connected to a first terminal of the resonance circuit 5. The third switch S3 is connected to the resonance circuit 5 and to the second terminal 3b of the contact arrangement 3. The fourth switch S4 is connected to the resonance circuit and to the first terminal 3a of the contact arrangement 3. The third switch S3 and the fourth switch S4 are both connected to a second terminal of the resonance circuit 5.

The control system 7' is arranged to alternatingly first set both the first switch S1 and the third switch S3 simultaneously first in the open state and then in the closed state, and then to set both the second switch S2 and the fourth switch S4 simultaneously in first in the open state and the in the closed state upon the commencement of a current breaking operation involving the opening of the breaker contact relative to the fixed contact. The control system 7' is arranged to alternatingly switch the switches S1-S4 until a current pulse, emanating from energy supplied by the contact arrangement arc current, flowing through the resonance circuit 5 and into the contact arrangement via the first switch S1 has an amplitude which is equal to or preferably larger than the contact arrangement arc current flowing through the contact arrangement 3.

Figure 5A:
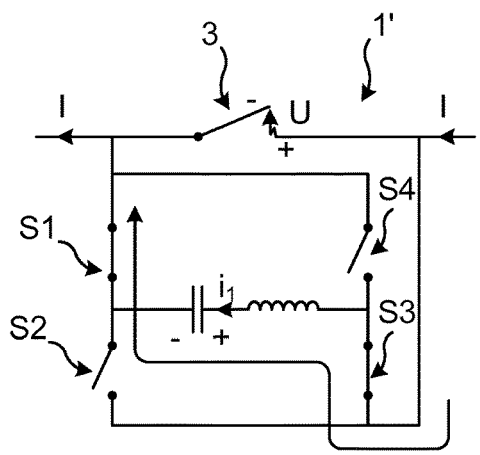
FIGS. 5a-5b shows the switching system for breaking a current in FIG. 4 in operation.
Figure 5B:
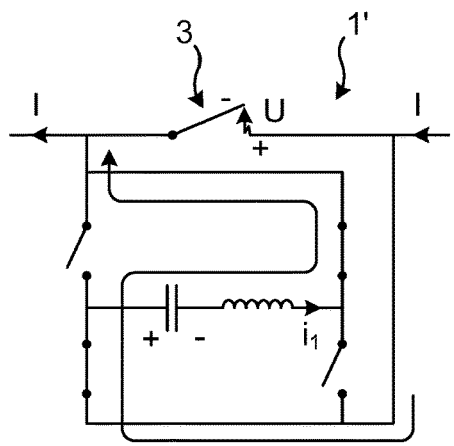
Figure 6:
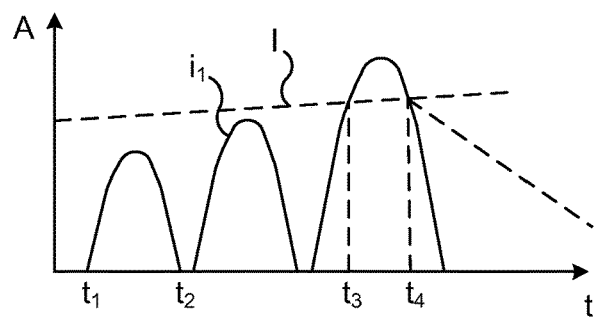
FIG. 6 shows a graph of current pulses obtained by means of the circuit breaker in FIG. 4.
Figure 7:
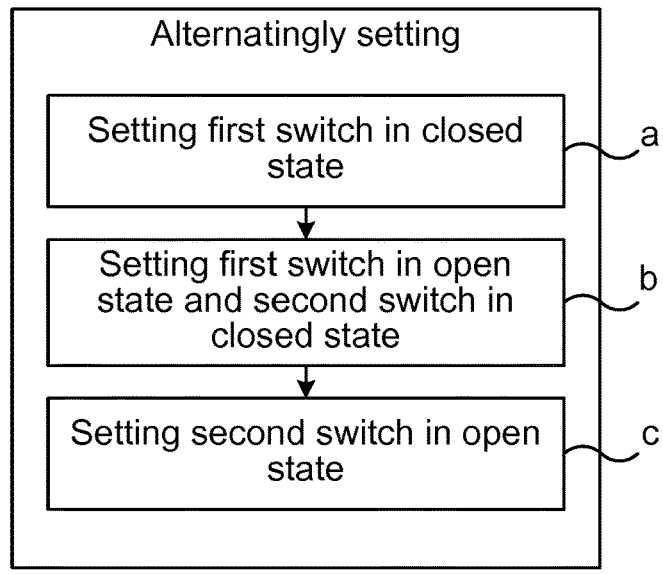
FIG. 7 is a flowchart of a method of performing a current breaking operation.

The operation of the switching system 1' will now be described with reference to FIGS. 5a-5b and FIG. 6. Under normal conditions current flows through the closed contact arrangement 3. All of the switches S1-S4 are in their open state. When the breaker contact is opened to effect a current breaking operation, in order to set the contact arrangement 3 in the open state, or a short time thereafter, the control system 7' is arranged to set both the first switch S1 and the third switch S3 in their closed state at a time t1, as shown in FIG. 6. A current pulse i1, driven by the arc voltage U, starts to flow through the resonance circuit 5 in a first flow direction, charging the capacitor C to a positive polarity.

When the current pulse i1 oscillates back and becomes zero at time t2, the control system 7' is arranged to set the first switch and the third switch S3 in the open state, i.e. they are switched off. The capacitor C is now charged approximately to the voltage 2U.

At a time t2, or a short time thereafter, the control system 7' is arranged to set both the second switch S2 and the fourth switch S4 in the closed state. The current pulse i1 will start again but now flowing in a second flow direction, opposite to the first flow direction, through the resonance circuit 5 and the capacitor C. The control system 7' is arranged to set the second switch S2 and the fourth switch S4 in the open state as soon as the current pulse i1 becomes zero and the capacitor C is charged to approximately the voltage −4U.

The above steps are then repeated and the voltage over the capacitor C will increase with approximately 2U in each iteration. After some iterations or cycles, the amplitude of the current pulse i1 has grown and when it becomes equal to or larger than the contact arrangement arc current I, at time t3 according to the example in FIG. 6, the arc will be extinguished momentarily at the instance that the current pulse i1 is equal to the contact arrangement arc current I, and finally permanently extinguished at time t4 by means of the arc extinguisher 9 and the energy absorber 11 in the same manner described in conjunction with the first example.

Figure 8A:
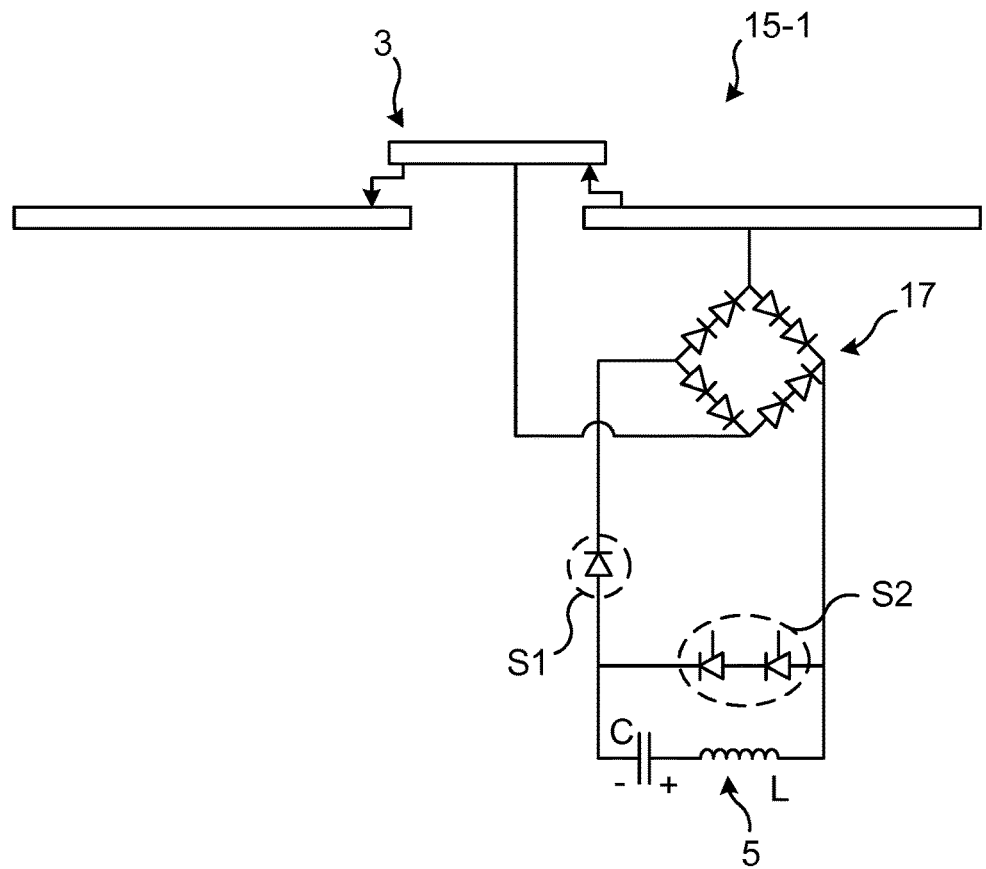
FIGS. 8a-8c show examples of a switching system for breaking a current which able to handle bi-directional current flow, i.e. alternating current.
Figure 8B:
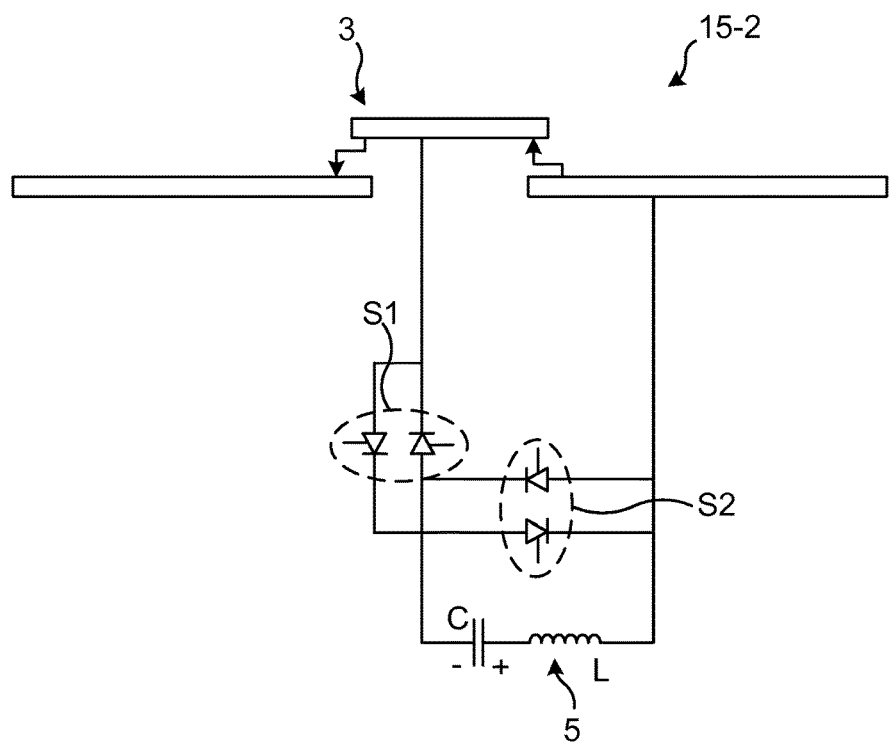
Figure 8C:
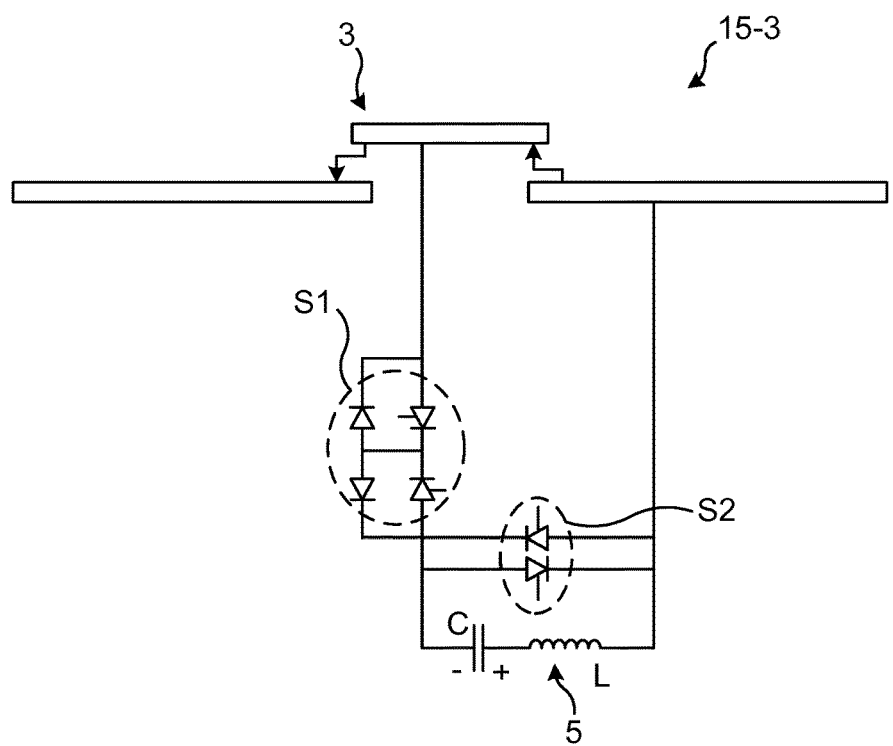

FIGS. 8a to 8c show additional examples of switching systems for breaking currents. These switching systems are able to handle bi-directional current flow through the contact arrangement 3. In all three figures, the breaker contact is separated from the fixed contact(s), with arcs being shown between the separated contacts.

FIG. 8a shows a first example of a switching system 15-1 which is able to handle bi-directional current flow through the contact arrangement 3. The switching system 15-1 comprises a first switch S1 and a second switch S2. The first switch S1 is according to the example realised by means of a thyristor, and the second switch S2 is realised by means of two series connected thyristors. These switches could however be realised by any semiconductor switch, for example transistors.

The switching system 15-1 furthermore comprises a resonant circuit 5, which includes a capacitor C and an inductor L. The switching system 15-1 also comprises a rectifier in the form of a diode bridge 17 which is arranged to provide a current pulse to the resonance circuit 5 during both current directions of the arc current. The first switch S1 and the second switch S2 are operated in the same manner as previously described, controlled by means of a control system.

FIG. 8b depicts a second example of a switching system 15-2 which is able to handle bi-directional current flow through the contact arrangement 3. The switching system 15-2 comprises a first switch S1 realised by means of two anti-parallel connected semiconductor switches, e.g. thyristors or transistors, and a second switch S2 realised by two anti-parallel connected semiconductor switches, e.g. thyristors or transistors. The second switch S2 is connected across the resonance circuit 5, and the first switch S1 is connected to the contact arrangement 3 and to the resonant circuit 5.

FIG. 8c depicts a third example of a switching system 15-3 which is able to handle bi-directional current flow through the contact arrangement 3. The switching system 15-3 comprises a first switch S1 realised by means of two semiconductor switches, e.g. thyristors or transistors and two diodes, and a second switch S2 realised by two anti-parallel connected semiconductor switches, e.g. thyristors or transistors. The second switch S2 is connected across the resonance circuit 5, and the first switch S1 is connected to the contact arrangement 3 and to the resonance circuit 5.

Each of the bi-directional switching systems 15-1 to 15-3 furthermore comprise surge arresters, arranged to force the contact arrangement arc current to zero upon the creation of an artificial zero-crossing.

In the examples above, the switches may for example be semiconductor switches such as thyristors or transistors. In each of the examples presented above, the control system may for example comprise gate drive units for semiconductor switches.

In general, the frequency which the control unit alternatingly switches first the first switch and then the second switch, first in the closed state and then in the open state may be dependent of the condition or characteristics of the arc. To this end, the frequency with which the current pumping or current injection is performed may thus be set to dependent of the characteristics of the arc.

If the contact arrangement arc current is relatively low, it is advantageous to perform the switching, and thus the current injection or pumping, with a relatively high frequency. For high contact arrangement arc currents on the other hand it is advantageous to perform the switching with lower frequency compared to when a low contact arrangement current is present, giving the heated gas more time to de-ionize. The terms "low" and "high" are generally difficult to define, because they may be dependent on parameters such as the particular alloy or material of the contact arrangement. It could in general be stated that a low contact arrangement arc current may be characterised by a magnitude of up to about a couple of 100 Amperes, while a high contact arrangement arc current could have a magnitude above that.

In case the magnitude of the contact arrangement arc current is know to always fall into one of the "low" and "high" category for a certain application, the control system may be set or programmed beforehand so that the frequency with which it switches the first switch and the second switch is set to a suitable value adapted to this magnitude.

For certain applications, it is not possible to know the magnitude of the contact arrangement arc current beforehand, i.e. before it occurs. In this case, the switching system may according to one variation include a sensor system arranged to detect the magnitude of the contact arrangement arc current, and whereby the control system is configured to adapt the frequency with which it controls the first switch and the second switch, based on the determined magnitude of the contact arrangement arc current. The switching may thus be performed either with a relatively lower or a higher frequency depending on whether the contact arrangement arc current is classified as high or low, respectively.

According to another variation, for example if no sensor system is present e.g. for a more robust switching system, whereby no current measurement may be provided, the control system may be configured to alternatingly switch first the first switch and then the second switch, first in the closed state and then in the open state, with a first frequency for a first time interval and subsequently with a second frequency slower than the first frequency for a second time interval. The first time interval may for example correspond to 3-5 periods or switch intervals. The second time interval may be the remaining time until the arc has been successfully extinguished, or it can correspond to a plurality of switch intervals, which here have a longer period. This is particularly the case for a half-wave circuit. In the case of a full-wave circuit, the third switch and the fourth switch may also be controlled in this manner by the control system.

According to one variation, the control system may be configured to alternatingly switch first the first switch and then the second switch, first in the closed state and then in the open state, with a third frequency for a third time interval after the second time interval, which third frequency is slower than the second frequency. This is particularly the case for a half-wave circuit. In the case of a full-wave circuit, the third switch and the fourth switch may also be controlled in this manner by the control system.

The switching systems presented herein may be utilised in AC applications and DC applications, and may for example be utilised in low voltage (LV) applications or medium voltage (MV) applications.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A switching system for breaking a current, comprising:
a contact arrangement having a first terminal and a second terminal,
a resonance circuit connectable across the contact arrangement,
a first switch connected to the resonance circuit and to the first terminal, wherein the first switch is switchable between an open state and a closed state, wherein in the closed state the first switch is arranged to enable current to flow through the resonance circuit in a first flow direction and into the contact arrangement in a direction opposite to a contact arrangement arc current flow direction,
a second switch connected to the resonance circuit and to the second terminal of the contact arrangement, wherein the second switch is switchable between an open state and a closed state, wherein in the closed state the second switch is arranged to enable current to flow through the resonance circuit in a second flow direction opposite to the first flow direction, and
a control system,
wherein the control system is arranged to alternatingly first set the first switch, and then the second switch, first in the closed state and then in the open state upon a current breaking operation, until a current pulse, emanating from energy supplied by a contact arrangement arc current, flowing through the resonance circuit and into the contact arrangement reaches an amplitude which is equal to or greater than a magnitude of the contact arrangement arc current.

2. The switching system as claimed in claim 1, wherein in each iteration of alternatingly first setting the first switch, and then the second switch, first in the closed state and then in the open state, the control system is arranged to:
set the first switch in the closed position, enabling a first current pulse to flow through the resonance circuit in the first flow direction,
set first the first switch in the open state and then the second switch in the closed state when the first current pulse has become zero to enable a second current pulse to flow through the resonance circuit in the second flow direction, and
to set the second switch in the open state when the second current pulse first has become zero.

3. The switching system as claimed in claim 1, comprising an arc extinguisher arranged to extinguish an arc across the contact arrangement.

4. The switching system as claimed in claim 1, wherein the resonance circuit comprises a capacitor and an inductor.

5. The switching system as claimed in claim 1, wherein the second switch is connected across the resonance circuit.

6. The switching system as claimed in claim 1, comprising a third switch switchable between an open state and a closed state, wherein the third switch is connected to the second terminal of the contact arrangement and to the resonance circuit, and wherein the control system is arranged to set the third switch in the closed state simultaneously with setting the first switch in the dosed state and to set the third switch in the open state simultaneously with setting the first switch in the open state.

7. The switching system as claimed in claim 6, comprising a fourth switch switchable between an open state and a closed state, wherein the fourth switch is connected to the resonance circuit and to the first terminal of the contact arrangement, and wherein the control system is arranged to set the fourth switch in the closed state simultaneously with setting the second switch in the closed state and to set the fourth switch in the open state simultaneously with setting the second switch in the open state.

8. The switching system as claimed in claim 1, wherein the first switch and the second switch are semiconductor switches.

9. The switching system as claimed in claim 7, wherein the third switch and the fourth switch are semiconductor switches.

10. The switching system as claimed in claim 1, wherein the control system is configured to alternatingly switch first the first switch and then the second switch, first in the closed state and then in the open state, with a first frequency for a first time interval and subsequently with a second frequency slower than the first frequency for a second time interval.

11. A method of performing a current breaking operation by means of a switching system comprising a contact arrangement having a first terminal and a second terminal, a resonance circuit connectable across the contact arrangement, a first switch connected to the resonance circuit and to the first terminal, wherein the first switch is switchable between an open state and a closed state, wherein in the closed state the first switch is arranged to enable current to flow through the resonance circuit in a first flow direction and into the contact arrangement in a direction opposite to a contact arrangement arc current flow direction, a second switch connected to the resonance circuit and to the second terminal, wherein the second switch is switchable between an open state and a closed state, wherein in the closed state the second switch is arranged to enable current to flow through the resonance circuit in a second flow direction opposite to the first flow direction, and a control system, wherein the method comprises:

alternatingly first setting the first switch, and then the second switch, first in the closed state and then in the open state by means of the control system, upon a current breaking operation, until a current pulse, emanating from energy supplied by a contact arrangement arc current, flowing through the resonance circuit reaches an amplitude which is equal to or greater than a magnitude of the contact arrangement arc current.

12. The method as claimed in claim 11, wherein each iteration of the step of alternatingly first setting the first switch, and then the second switch, first in the closed state and then in the open state comprises:
   a) setting the first switch in the closed state, enabling a first current pulse to flow through the resonance circuit in the first flow direction,
   b) setting first the first switch in the open state and then the second switch in the closed state when the first current pulse has become zero to enable a second current pulse to flow through the resonance circuit in the second flow direction, and
   c) setting the second switch in the open state when the second current pulse first has become zero.

13. The method as claimed in claim 12, wherein the switching system comprises a third switch switchable between an open state and a closed state, wherein the third switch is connected to the second terminal of the contact arrangement and to the resonance circuit, wherein the step of alternatingly first setting the first switch, and then the second switch, first in the closed state and then in the open state comprises:

setting the third switch in the closed state simultaneously with setting the first switch in the closed state, and
setting the third switch in the open state simultaneously with setting the first switch in the open state.

14. The method as claimed in claim 13, wherein the switching system comprises a fourth switch switchable between an open state and a closed state, wherein the fourth switch is connected to the resonance circuit and to the first terminal of the contact arrangement, wherein the step of alternatingly first setting the first switch, and then the second switch, first in the closed state and then in the open state comprises:

setting the fourth switch in the closed state simultaneously with setting the second switch in the closed state, and
setting the fourth switch in the open state simultaneously with setting the second switch in the open state.

15. The method as claimed in claim 11, wherein the switching system comprises an arc extinguisher, wherein the method comprises extinguishing an arc across the contact arrangement by means of the arc extinguisher when the current pulse flowing through the resonance circuit reaches an amplitude which is equal to or greater than a magnitude of the contact arrangement arc current.

16. The method as claimed in claim 11, wherein the resonance circuit comprises a capacitor and an inductor.

17. The method as claimed in claim 11, wherein the step of alternatingly first setting the first switch and then the second switch, first in the closed state and then in the open state, is performed with a first frequency for a first time interval and subsequently with a second frequency slower than the first frequency for a second time interval.

18. The switching system as claimed in claim 2, comprising an arc extinguisher arranged to extinguish an arc across the contact arrangement.

19. The switching system as claimed in claim 9, wherein the first switch and the second switch are semiconductor switches.

20. The method as claimed in claim 11, wherein the switching system comprises a third switch switchable between an open state and a closed state, wherein the third switch is connected to the second terminal of the contact arrangement and to the resonance circuit, wherein the step of alternatingly first setting the first switch, and then the second switch, first in the closed state and then in the open state comprises:

setting the third switch in the closed state simultaneously with setting the first switch in the closed state, and
setting the third switch in the open state simultaneously with setting the first switch in the open state.

* * * * *